A. FAGET.
INSULATED AIR PIPE.
APPLICATION FILED DEC. 6, 1909.
1,006,640.
Patented Oct. 24, 1911.
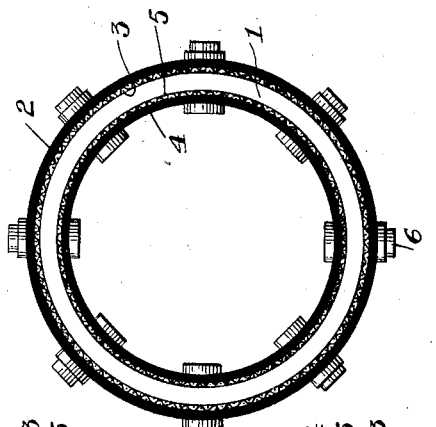
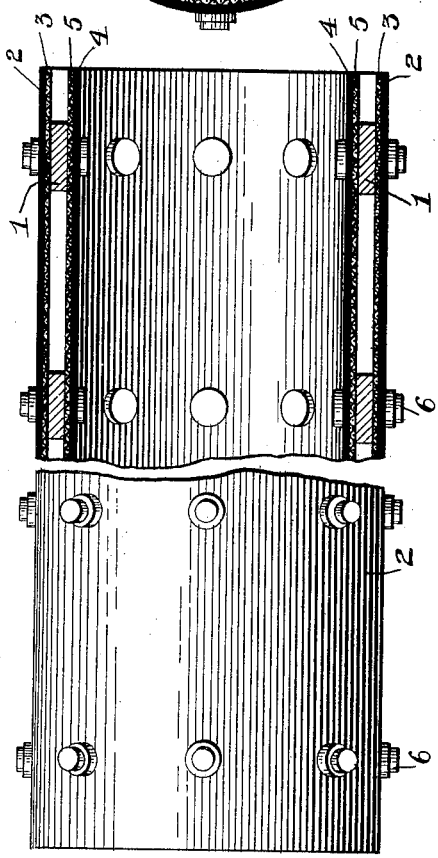
Witnesses.
Roswell P. Rogers.
Sidney Hotchner.
Inventor.
Arthur Faget   by,
Carlos P. Griffin, Atty.

UNITED STATES PATENT OFFICE.

ARTHUR FAGET, OF SAN FRANCISCO, CALIFORNIA.

INSULATED AIR-PIPE.

1,006,640.

Specification of Letters Patent.

Patented Oct. 24, 1911.

Application filed December 6, 1909. Serial No. 531,719.

*To all whom it may concern:*

Be it known that I, ARTHUR FAGET, a citizen of the United States, residing at San Francisco, in the county of San Francisco and State of California, have invented a new and useful Insulated Air-Pipe, of which the following is a specification in such full and clear terms as will enable those skilled in the art to construct and use the same.

This invention relates to an air pipe for car pre-cooling plants, and its object is to produce a very large air pipe which will be at the same time very flexible, and which will be insulated to prevent the cold air from passing therefrom.

In the drawings, in which the same numeral of reference is applied to the same portion throughout the several views, Figure 1 is a side elevation of a portion of such a flexible pipe, Fig. 2 is a sectional view of a portion of the pipe, and Fig. 3 is an end elevation of the pipe.

The pipe is formed of canvas and rubber sheets, the sheets being supported by a plurality of wooden hoops, said wooden hoops being so placed as to leave an air space between the several inner layers of rubber canvas, and the outer layers thereof.

The hoops 1 are of such thickness as to leave space between the outer layer of rubber 2 and canvas 3 and the inner layer of rubber 4 and canvas 5, the layers of rubber being placed inside the tube and outside the same, the object being to produce a substantially air-tight pipe, and to make the same waterproof, as well. The inner and outer layers of rubber and canvas are secured to the hoops by means of a plurality of rivets 6 passing through the hoops and layers of rubber covered fabric. It is to be noted that while such a pipe as this will have considerable resistance to flattening due to the strength of the hoops, that it can be very easily bent to one side or the other as may be desired. Its especial object is to connect two openings which may or may not be placed at the same distance from each other at all times; as for example to connect the air line of a pre-cooling plant with the air supply openings of a car door, this requiring a pipe having considerable flexibility.

A still further advantage of this form of pipe is that the wooden hoops leave an air space which effectually insulates the air within the pipe from the air outside the same, thus enabling the cold air from the refrigeration plant to be delivered to the cars without having heat added thereto.

Having thus described my invention, what I claim as new and desire to secure by Letters Patent of the United States is as follows:

1. In an air pipe, a flexible fabric inner lining, a plurality of wooden hoops surrounding said inner lining, a fabric and rubber outer covering surrounding said hoops, and spaced from the inner lining, and rivets to secure the hoops, lining and covering together, substantially as described.

2. In an air pipe, a flexible fabric having a rubber facing on the inside, a plurality of wooden hoops surrounding said inner lining, a flexible fabric having a rubber facing on the outside thereof surrounding said hoops and spaced from the inner lining and rivets to secure the covering, hoops and lining together, substantially as described.

In testimony whereof I have hereunto set my hand this 22 day of Nov. A. D. 1909, in the presence of the two subscribed witnesses.

ARTHUR FAGET.

Witnesses:
 IVAN C. FRICKSTAD,
 CARLOS P. GRIFFIN.

---

Copies of this patent may be obtained for five cents each, by addressing the "Commissioner of Patents, Washington, D. C."